No. 747,921. Patented December 22, 1903.

UNITED STATES PATENT OFFICE.

HERMANN PASSOW, OF BLANKENESE, NEAR HAMBURG, GERMANY, ASSIGNOR TO HENRY EDMUNDS, OF LONDON, ENGLAND.

CEMENT AND PROCESS OF PRODUCING SAME.

SPECIFICATION forming part of Letters Patent No. 747,921, dated December 22, 1903.

Application filed August 16, 1900. Serial No. 27,057. (No specimens.)

*To all whom it may concern:*

Be it known that I, HERMANN PASSOW, a subject of the German Emperor, and a resident of Blankenese, near Hamburg, Germany, have invented certain new and useful Improvements in Cement and Processes of Producing the Same, of which the following is a specification.

This invention relates to the production of cement, and relates especially to the production of a highly-cementitious material from furnace-slag alone without the admixture of lime. Slag for this purpose may be produced by smelting down the raw materials to a homogeneous mass in a suitable furnace, or blast-furnace slag may be used, the slag in either case being heated to a molten condition and treated with fluid containing oxygen. Any desired apparatus may be employed for this purpose which secures the proper treatment of the slag to convert the slag into the desired cementitious material. Rotating drums may be used in which the slag is brought intimately into contact with air or other fluids, or fluid slag may be treated in a Bessemer converter or similar apparatus by forcing air through the heated slag until the slag is converted into granulated cement-clinker. This radical change is indicated by the fact that the slag, which when cooled in the ordinary manner decrepitates into furnace-meal, does not crumble or decrepitate after being converted. The extent of the treatment of the slag and the quantity of oxygen-bearing fluid may be varied to suit the properties of the particular slag operated upon, the slag being treated in the apparatus in the presence of oxygen-bearing fluids until the proper conversion takes place, so that the final product is a cement-clinker which when properly ground is a highly-cementitious material without the necessity of adding other materials thereto and has an essentially different character from the material produced from the slag by cooling it in the usual ways. The furnace-slag may thus be converted into a valuable cementitious material which sets in a few hours and which stands the boiling test after having set in air for a day and having remained in water four hours. This air-granulated product is thus a real cement and has valuable hydraulic properties greatly exceeding the slight cementitious properties of water granulated or decrepitated furnace-slag. It may be used with advantage as an addition to Portland cement without necessarily requiring an increase in the usual proportion of lime in such cement, although the standard Portland cement contains sixty to sixty-five per cent. of lime, considerably more than the ground air-granulated furnace-slags produced by this process, which of course vary in lime according to the particular slag used.

It is of course understood that those familiar with this art may make many variations in this process and the resulting product and apparatus of various forms may of course be employed without departing from the spirit of this invention or losing the advantage of the same.

What I claim as new and what I desire to secure by Letters Patent is set forth in the appended claims:

1. The cement process, that consists in bringing furnace-slag to a molten condition and in blowing jets of fluid containing oxygen through said slag in a Bessemer converter, so as to convert said slag into granulated clinker, having highly-cementitious properties without the necessity for the addition of other materials.

2. The cement process, that consists in bringing furnace-slag to a highly-heated condition and in blowing fluid containing oxygen through said slag, so that said slag is converted into clinker, having, without the addition of other material, highly-cementitious properties.

3. The cement process, that consists in bringing furnace-slag to a highly-heated condition and in subjecting the same to the action of relatively moving fluid containing oxygen, so that said slag is converted into granular material, having, without the addition of other material, highly-cementitious properties.

4. The cement process, that consists in bringing slag material to a highly-heated condition and in bringing the same intimately in contact with fluid containing oxygen, so as to convert said slag material into a material, having, without the addition of other material, highly-cementitious properties.

5. The cement process, that consists in bringing slag material to a highly-heated condition and in thereupon treating the same substantially as set forth, so as to convert the same into a material, having, without the addition of other material, highly-cementitious properties.

6. The material, having without the addition of other material highly-cementitious properties, that consists of furnace-slag, through which, when molten, fluid containing oxygen was blown until said slag was converted into clinker.

7. The material, having without the addition of other material highly-cementitious properties, consisting of furnace-slag, which when highly heated and without addition of lime was brought into intimate contact with fluid containing oxygen.

8. The material, having without the addition of other material highly-cementitious properties, and having substantially the chemical composition of furnace-slag containing considerably less lime than Portland cement, formed from said furnace-slag, without the addition of lime, by treating said slag at high temperature.

9. The material, formed from furnace-slag which crumbles after being cooled in the ordinary way in air, said material having substantially the same proportion of lime as said furnace-slag, being non-crumbling on exposure to air and having, without the addition of lime, highly-cementitious properties.

10. The material formed from furnace-slag, said material having substantially the same proportion of lime as said furnace-slag, being non-crumbling on exposure to air and having, without the addition of lime, highly-cementitious properties.

11. The material, formed from furnace-slag containing considerably less lime than Portland cement, having substantially the same proportion of lime as said furnace-slag and having, without the addition of other material, highly-cementitious properties.

12. The material formed from furnace-slag, having substantially the same proportion of lime as said furnace-slag and having, without the necessity of adding lime, highly-cementitious properties.

In testimony whereof I have signed my name to this specification in the presence of two subscribing witnesses.

HERMANN PASSOW.

Witnesses:
E. H. L. MUMMENHOFF,
OTTO W. HELLMRICH.